Dec. 20, 1927.
G. L. TAYLOR
1,653,129
CUTTING MECHANISM
Filed Jan. 21, 1927
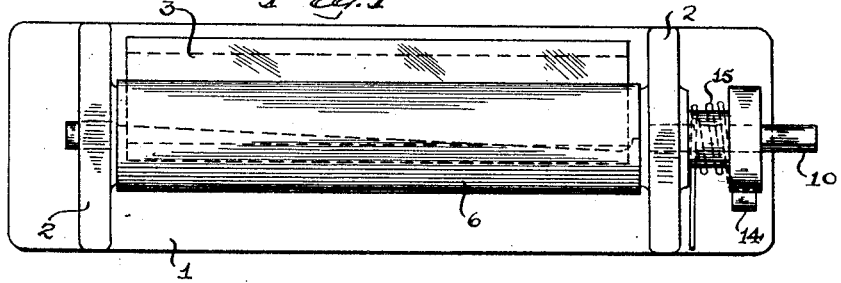
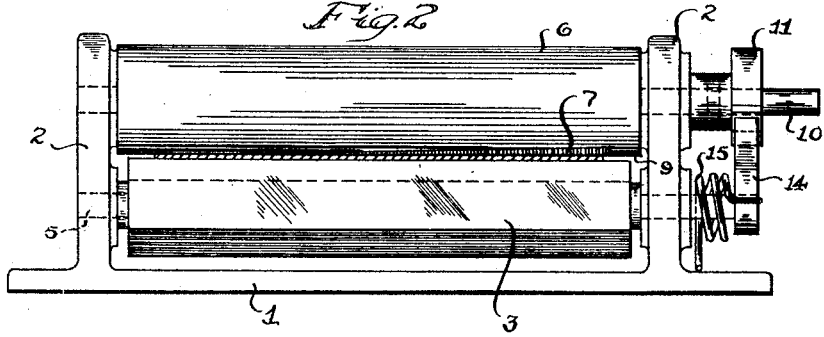
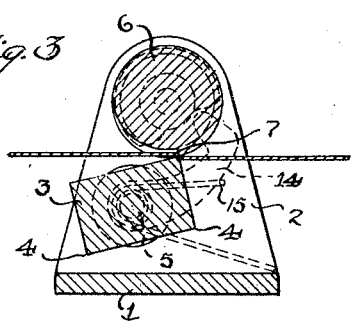
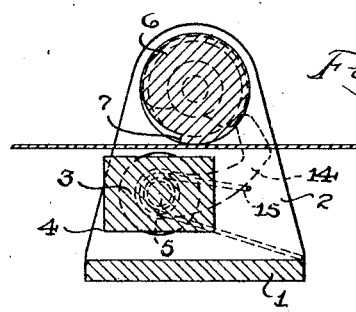
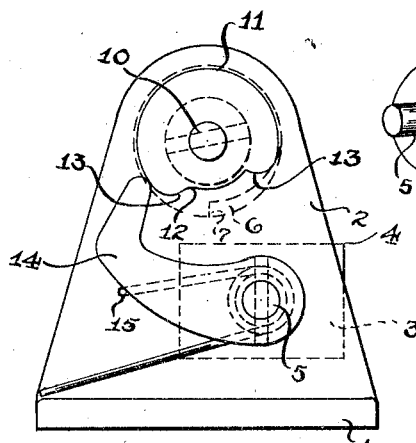
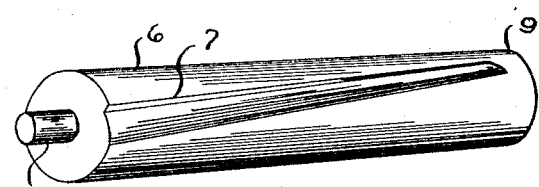
INVENTOR
George L. Taylor
BY
H. W. Simms
his ATTORNEY Patented Dec. 20, 1927.

1,653,129

UNITED STATES PATENT OFFICE.

GEORGE L. TAYLOR, OF ROCHESTER, NEW YORK, ASSIGNOR TO KOPYGRAPH, INCORPORATED, OF BATAVIA, NEW YORK.

CUTTING MECHANISM.

Application filed January 21, 1927. Serial No. 162,443.

The present invention relates to cutting mechanisms and an object thereof is to provide a cutting mechanism of novel construction in which the cutting of sheet material may be effected by a rotary cutter producing a shearing cut. Another object of the invention is to provide a cutting mechanism in which the cutting is effected through a rotary cutter producing a shearing cut and in which the cutting mechanism may be rendered inactive while the material is being fed through the cutting mechanism.

To these and other ends, the invention consists of certain parts and combinations of parts, all of which will be hereinafter described, the novel features being pointed out in the appended claims.

In the drawings:

Fig. 1 is a plan view of a cutting mechanism constructed in accordance with this invention.

Fig. 2 shows the cutting mechanism in elevation.

Fig. 3 is a transverse section through the mechanism showing position of the cutters during the cutting operation.

Fig. 4 is a view showing the cutting mechanism rendered inoperative to permit the feeding of the work therethrough.

Fig. 5 is an end view of the cutting mechanism, and

Fig. 6 is a perspective view of the rotary cutting knife.

The cutting mechanism as herein illustrated is adapted for cutting strips of material at intervals where the strip is fed to the cutters by an independent feeding means, the cutting mechanism being brought into operation to sever the strip at predetermined intervals.

In the illustrated embodiment of the invention a base 1 is provided which has uprights 2 projected therefrom. Supported between the uprights is a cutting member 3 which has a rectangular cross section providing, in this instance, four cutting edges 4. This cutting member is mounted to oscillate on the frame and to this end is adjustable and detachably secured to a rock shaft 5 so that the cutting member may be shifted on the rock shaft to present any one of its cutting edges to cutting postion. The control of this oscillating member will be described hereinafter.

Cooperating with the oscillating cutter is a rotary cutter 6 which has a spiral or helically formed cutting edge 7 extending throughout the greater portion thereof but spaced at one end from the end of the cutter to provide a cylindrical portion 9 extending completely about the cutter.

If a cutting edge of the oscillatory cutter 3 is moved toward the rotary cutter while the latter is rotating the sheet will be pressed or held between the two cutters and the helical or spiral edge of the roller cutter will cooperate with the straight edge of the then stationary cutter 3 and sever the sheet lying between them. The cylindrical portion 9 prevents the cutter edge 4 being engaged by the cutter edge 7 of the rotary cutter and producing injury to the cutting edges.

In the illustrated embodiment of the invention the rotary cutter is rotated continuously through the driving of a shaft 10, and, in order that the oscillatory cutter may be moved toward the rotary cutter there is employed on the shaft 10 a rotary cam having a high point 11 concentric with axis of turning of the shaft and a low point 12 also concentric with the axis of turning of the shaft and connected with the high point through cam portions 13 at opposite ends of the low point. With this cam, the end of an arm 14 cooperates, this arm being rigidly secured to the oscillatory shaft 5. A spring 15 acts on the arm 14 normally to hold the end of the latter against the cam on the shaft 10 and as a consequence the cutters are yieldingly held one toward the other. So long as the end of the arm 14 cooperates with the high point 11 of the cam, the cutting edge of the oscillatory cutter 3 will be held out of cooperation with the rotary cutter 6 and, as a consequence, material may be fed between the two cutting members in any suitable manner. However, when the end of the arm 14 moves on a cam surface 13 to the low point 12, the cutting blade 3 is rocked into cooperation with the rotary cutter and the cutting takes place while the arm 14 is cooperating with the concentric low portion 12. After the cutting, the arm 14 again cooperates with the cam surface 13 and the oscillatory cutter 3 is moved away from the rotary cutter 6 again permitting the feeding of the material between the two cutters.

While in the illustrated embodiment the cutter which is fixed during the cutting action is moved relatively to the rotary cutter to permit the feeding of the material between the two cutters, it is apparent that the invention is not limited to this method of separation as it is within the scope of this invention to effect the relative separation between the two cutters in any suitable manner, altho the means herein shown is a desirable and effective form.

What I claim as my invention and desire to secure by Letters Patent is:

1. A sheet cutting mechanism comprising a cutter having a straight cutting edge, a rotary cutter having a helical cutting edge and provided with a cylindrical surface extending completely around the same to cooperate with the straight cutting edge in order to prevent the helical cutting edge striking the straight cutting edge, and means for effecting a separation between the two cutters to permit the material to be fed between them.

2. A sheel cutting mechanism comprising a cutter having a straight cutting edge, a rotary cutter having a helical cutting edge, means supporting the first named cutter so that its cutting edge may swing into and out of cooperation with the rotary cutter, a cam on the shaft of the rotary cutter, and an arm connected with the first mentioned cutter and cooperating with said cam so that the rotation of the rotary cutter in addition to effecting the cutting action also effects the swinging action of the first named cutter.

3. A sheet cutting mechanism comprising a cutter having a straight cutting edge, a rotary cutter having a helical cutting edge, means supporting the first named cutter so that its cutting edge may swing into and out of cooperation with the rotary cutter, a cam on the shaft of the rotary cutter, and an arm connected with the first mentioned cutter and cooperating with said cam so that the rotation of the rotary cutter in addition to effecting the cutting action also effects the swinging action of the first named cutter, and yielding means acting on the first named cutter to hold the arm in cooperation with the cam and the first named cutter in yielding relation to the rotary cutter.

4. A sheet cutting mechanism comprising a cutter having a straight cutting edge, a rotary cutter having a helical cutting edge, means yieldingly holding said cutters in cooperation, and means for effecting the separation of said cutters against the action of said yielding means to permit material to be fed between the cutters.

GEORGE L. TAYLOR.